(12) United States Patent
Hori et al.

(10) Patent No.: US 10,866,443 B2
(45) Date of Patent: Dec. 15, 2020

(54) ADHESIVE LAYER-EQUIPPED TRANSPARENT PLATE AND DISPLAY DEVICE

(71) Applicant: AGC Inc., Chiyoda-ku (JP)

(72) Inventors: Yuki Hori, Chiyoda-ku (JP); Katsuhiro Kobayashi, Chiyoda-ku (JP); Tateo Baba, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/208,846

(22) Filed: Dec. 4, 2018

(65) Prior Publication Data

US 2019/0187510 A1 Jun. 20, 2019

(30) Foreign Application Priority Data

Dec. 20, 2017 (JP) .................. 2017-244240
Sep. 21, 2018 (JP) .................. 2018-177605

(51) Int. Cl.
| G02F 1/1333 | (2006.01) |
| B32B 7/12 | (2006.01) |
| B32B 3/08 | (2006.01) |
| B32B 3/02 | (2006.01) |
| B32B 17/06 | (2006.01) |

(52) U.S. Cl.
CPC .......... G02F 1/133308 (2013.01); B32B 3/02 (2013.01); B32B 3/08 (2013.01); B32B 7/12 (2013.01); B32B 17/06 (2013.01); B32B 17/064 (2013.01); B32B 2307/412 (2013.01); B32B 2405/00 (2013.01); B32B 2457/20 (2013.01); G02F 2001/133331 (2013.01); G02F 2202/28 (2013.01)

(58) Field of Classification Search
CPC ..... G02F 2202/28; G02F 2001/133331; B32B 13/12; B32B 15/08; B32B 17/064; B32B 27/00; B32B 17/00; B32B 17/06; B32B 1/04; B32B 1/00
See application file for complete search history.

(56) References Cited

U.S. PATENT DOCUMENTS

| 2010/0231821 A1* | 9/2010 | Tsuji ................. G02F 1/133308 349/58 |
| 2011/0007391 A1 | 1/2011 | Takahashi |
| 2015/0092122 A1* | 4/2015 | Youn ..................... G06F 1/1637 349/12 |
| 2017/0088749 A1 | 3/2017 | Tsuchida |
| 2018/0033969 A1* | 2/2018 | Kamijo ................ G02F 1/1345 |
| 2019/0146261 A1* | 5/2019 | Im ..................... G02F 1/133305 349/106 |

FOREIGN PATENT DOCUMENTS

WO    WO 2015/072380 A1    5/2015

* cited by examiner

*Primary Examiner* — Michael H Caley
*Assistant Examiner* — Mariam Qureshi
(74) *Attorney, Agent, or Firm* — Oblon, McClelland, Maier & Neustadt, L.L.P.

(57) ABSTRACT

An adhesive layer-equipped transparent plate includes a transparent plate having a first surface and a second surface; a first adhesive layer provided on the first surface; and a second adhesive layer provided on the second surface; wherein the transparent plate includes at least one of an exposed portion in a periphery of the first surface, where the first surface is exposed from the first adhesive layer, and an exposed portions in a periphery of the second surface, where the second surface is exposed from the second adhesive layer.

12 Claims, 10 Drawing Sheets

ADHESIVE LAYER-EQUIPPED TRANSPARENT PLATE AND DISPLAY DEVICE

TECHNICAL FIELD

The present invention relates to an adhesive layer-equipped transparent plate and a display device.

BACKGROUND ART

In recent years, as one of the application modes of a display device, the use of a display device in such a manner that it is bonded to a store window or a glass wall of an office so that the display surface faces outside, has been studied. By this mode, the display device can be utilized as a billboard, an advertising display, etc., since a passersby can recognize the display through the glass from the outside of the store or the office. For example, Patent Document 1 specified below discloses an arrangement where a display device main body, such as a liquid crystal panel, is bonded to a window glass via an adhesive layer-equipped transparent plate having an adhesive layer bonded to each of both surfaces thereof.

PRIOR ART DOCUMENTS

Patent Documents

Patent Document 1: WO2015/072380

DISCLOSURE OF INVENTION

Technical Problem

In a case where the bonding operation of a display device using the adhesive layer-equipped transparent plate disclosed in Patent Document 1 is performed, there has been, however, caused a problem that, for example, when a worker uses his or her hands to hold the adhesive layer-equipped transparent plate, the adhesive agent sticks to his or her hands to reduce the workability of the bonding operation. Or, there has been, caused a problem that even when a worker uses a jig, such as a holder, to hold the adhesive layer-equipped transparent plate at the time of performing the bonding operation, the adhesive agent sticks to the holder to reduce the workability of the bonding operation.

After a display device is utilized as a billboard, an advertising display, etc. for a store, the display device needs to be peeled from the window glass to restore the interior in the store in some cases. In such cases, there has been a problem that it is difficult for a worker to peel the adhesive layer-equipped transparent plate from the window glass.

According to one embodiment of the present invention, an adhesive layer-equipped transparent plate which makes it easy to perform a bonding operation for bonding a display device to a transparent support, such as a glass plate, or a peeling operation for peeling the display device from the transparent support. Further, according to another embodiment of the present invention, a display device which includes an adhesive layer-equipped transparent plate and which is excellent in the display quality, is provided.

Solution to Problem

The adhesive layer-equipped transparent plate according to one embodiment of the present invention includes a transparent plate having a first surface and a second surface; a first adhesive layer provided on the first surface; and a second adhesive layer provided on the second surface; wherein the transparent plate includes at least one of an exposed portion in a periphery of the first surface, where the first surface is exposed from the first adhesive layer, and an exposed portion in a periphery of the second surface, where the second surface is exposed from the second adhesive layer.

In the adhesive layer-equipped transparent plate according to one embodiment of the present invention, the transparent plate may be formed in a rectangular planar shape as observed from a normal direction of the first surface, and the exposed portion may be provided in a region along each of at least two sides of the four sides of the rectangular shape so as to be present at a portion of each of the at least two sides.

In the adhesive layer-equipped transparent plate according to one embodiment of the present invention, the exposed portion may be provided in a region along each of two opposing sides of the rectangular shape so as to be present at a portion of each of the two opposing sides.

In the adhesive layer-equipped transparent plate according to one embodiment of the present invention, the transparent plate may be formed in an oblong planar shape as observed from a normal direction of the first surface, and the exposed portion may be provided in a region along each of two opposing long sides of the oblong shape so as to be present at a portion of each of the two opposing long sides.

In the adhesive layer-equipped transparent plate according to one embodiment of the present invention, the exposed portion may be provided in a region along each of the four sides of the rectangular shape so as to be present at a portion of each of the four sides.

In the adhesive layer-equipped transparent plate according to one embodiment of the present invention, the transparent plate may be formed in a rectangular planar shape as observed from a normal direction of the first surface, and the exposed portion may be provided at a corner of the rectangular shape.

In the adhesive layer-equipped transparent plate according to one embodiment of the present invention, the first surface may include a first flat surface in a central area on the transparent plate, and a first inclined surface provided in the periphery of the transparent plate so as to be inclined to the first flat surface and have contact with an end surface perpendicular to the first flat surface, the second surface may include a second flat surface in a central area on the transparent plate, and a second inclined surface provided in the periphery of the transparent plate so as to be inclined to the second flat surface and have contact with an end surface perpendicular to the second flat surface, and the exposed portion may be provided on each of the first inclined surface and the second inclined surface.

In the adhesive layer-equipped transparent plate according to one embodiment of the present invention, the first surface or the second surface may have a light-shielding portion provided on the periphery thereof.

The display device according to one embodiment of the present invention includes an adhesive layer-equipped transparent plate according to one of the above-identified embodiments of the present invention, a transparent support bonded to the first surface of the adhesive layer-equipped transparent plate; and a display device main body bonded to the second surface of the adhesive layer-equipped transparent plate.

In the display device according to one embodiment of the present invention, the exposed portion may be provided on at least the first surface.

Advantageous Effects of Invention

According to one embodiment of the present invention, an adhesive layer-equipped transparent plate which makes it easy to perform a bonding operation for bonding a display device to a transparent support, such as a glass plate, or a peeling operation for peeling the display device from the transparent support. According to one embodiment of the present invention, a display device which includes an adhesive layer-equipped transparent plate and is excellent in the display quality, is provided.

DESCRIPTION OF EMBODIMENTS

First Embodiment

Now, a first embodiment of the present invention will be described with reference to FIGS. 1 to 5.

In the following drawings, in order to make various components easily understandable, the respective components may be shown as differentiated in their sizes.

In this specification, "transparent" means that after a plate and a display surface of a display device main body are bonded via an adhesive layer without a void space, the entire or a part of a display image on the display device main body is visible through the plate substantially without optical distortion. Accordingly, a plate can be regarded as "transparent" so long as a display image on a display device main body is visible substantially without optical distortion through the plate even if part of light which enters the plate from the display device main body is adsorbed or reflected by the plate, or even if the plate has a low visible light transmittance, e.g., by a change in the optical phase.

<Adhesive Layer-Equipped Transparent Plate>

Figure 1:
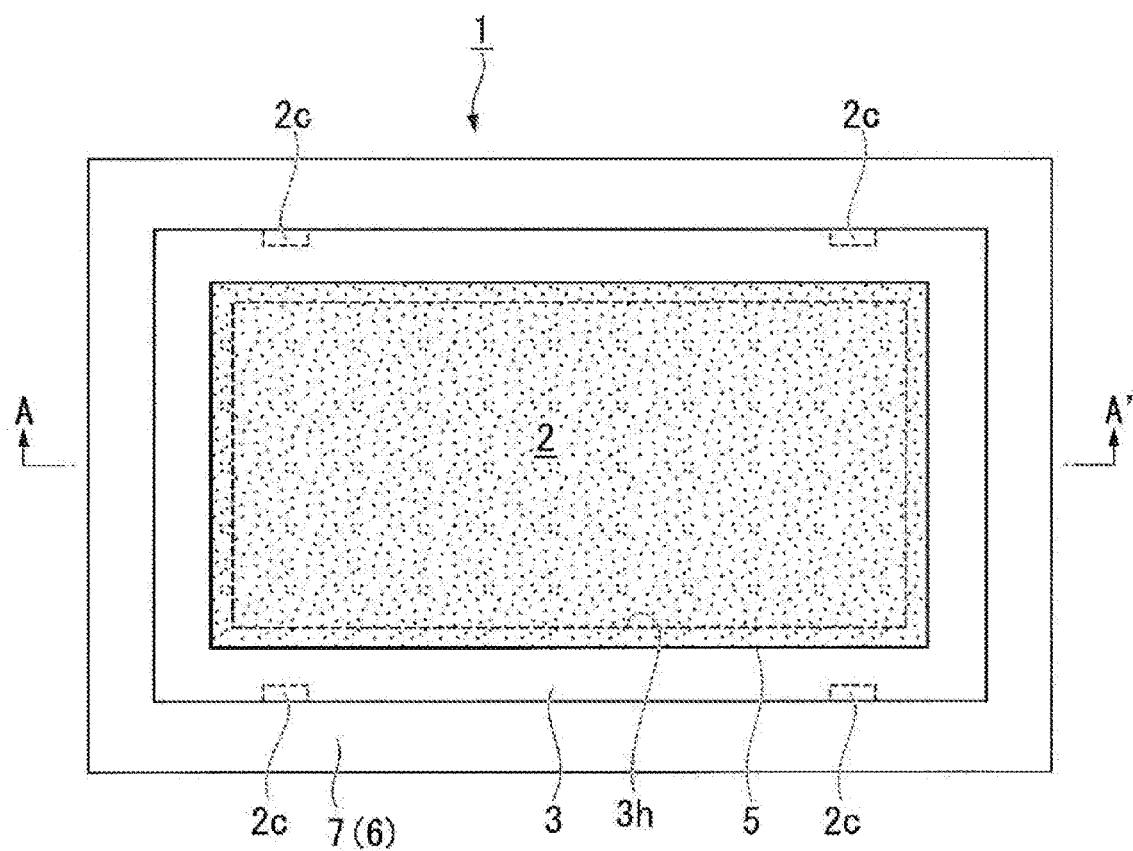
FIG. 1 is a plan view illustrating the adhesive layer-equipped transparent plate according to a first embodiment of the present invention.
Figure 2:
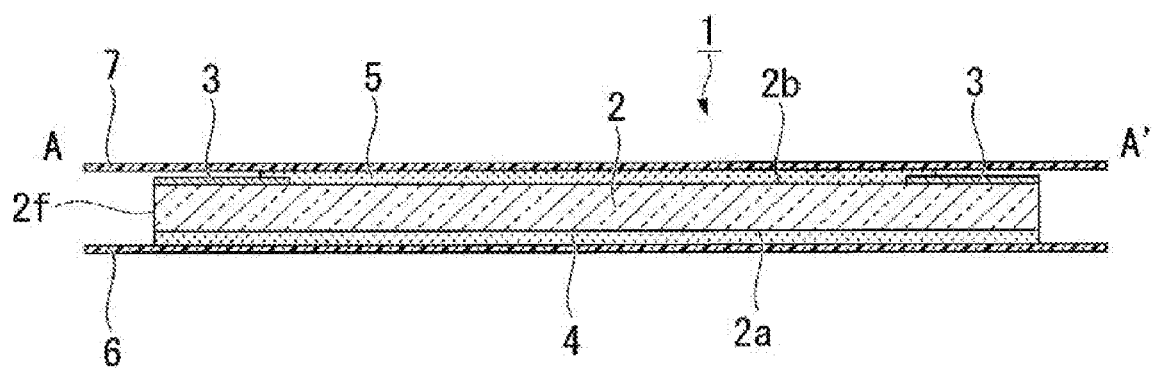
FIG. 2 is a cross-sectional view along the line A-A' in FIG. 1.
Figure 3:
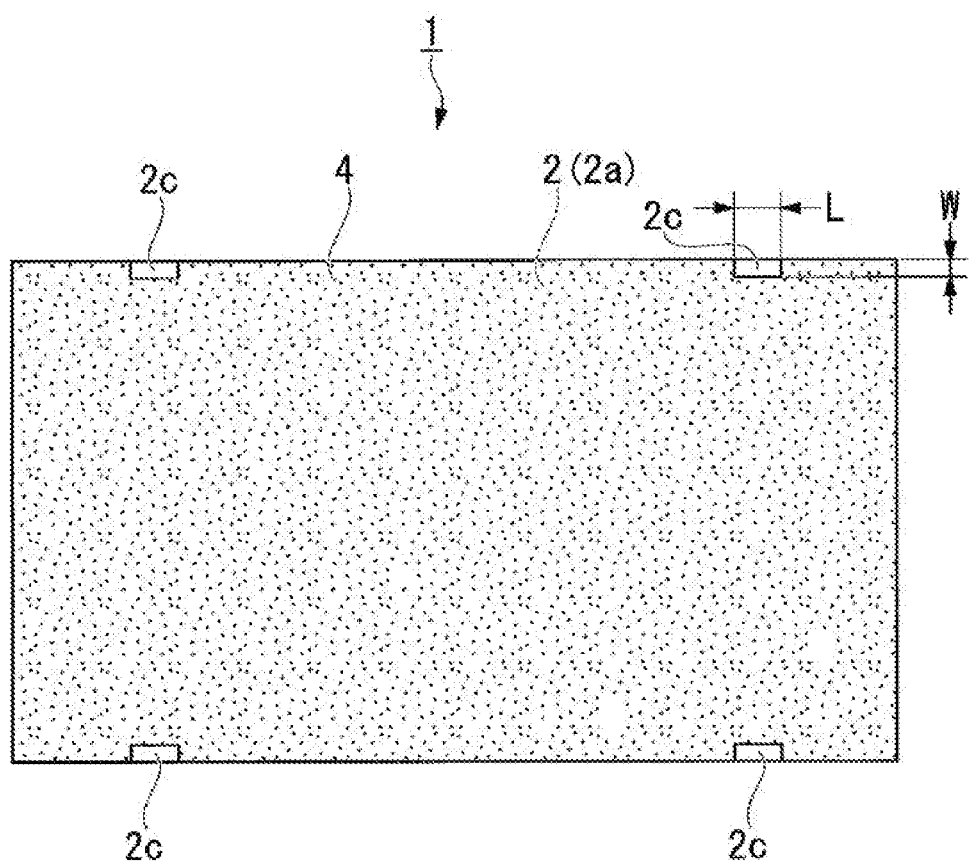
FIG. 3 is a plan view illustrating the adhesive layer-equipped transparent plate as observed from a first surface side.

FIG. 1 is a plan view illustrating the adhesive layer-equipped transparent plate according to the first embodiment. FIG. 2 is a cross-sectional view along the line A-A' in FIG. 1. FIG. 3 is a plan view illustrating the adhesive layer-equipped transparent plate as observed from a first surface side. FIG. 3 illustrates a state where a first protective film and a second protective film have been peeled from the adhesive layer-equipped transparent plate shown in FIGS. 1 and 2.

As shown in FIGS. 1 and 2, the adhesive layer-equipped transparent plate 1 according to the first embodiment includes a transparent plate 2, a light-shielding portion 3, a first adhesive layer 4, a second adhesive layer 5, the first protective film 6 and the second protective film 7. The light-shielding portion 3 is provided on the periphery of a second surface 2b of the transparent plate 2. The first adhesive layer 4 is provided on a first surface 2a of the transparent plate 2. The second adhesive layer 5 is provided on the second surface 2b of the transparent plate 2. The second surface 2b has a smaller area than the first adhesive layer 4.

(Transparent Plate)

The transparent plate 2 is a member in the form of a plate, which is a core material of the adhesive layer-equipped transparent plate 1 and which, when the after-mentioned display device main body is bonded to a transparent support, is to be interposed between the display device and the transparent support. The transparent plate 2 may, for example, be a glass plate or a resin plate. The transparent plate 2 is most preferably a glass plate in view of high transparency to injected light and reflected light from the display device main body, and in addition, in view of light resistance, low birefringence, high plane accuracy, surface abrasion resistance and high mechanical strength. The transparent plate 2 is preferably a glass plate also in view of high transmittance to light which cures a photocurable resin composition constituting the first adhesive layer 4 and the second adhesive layer 5.

As an example of the glass plate, a glass material, such as soda lime glass, may be mentioned. Further, the glass plate is more preferably a high transmission glass (commonly called low-iron glass) having a lower iron content and less bluish tone. In order to increase the safety, tempered glass may be used as the surface material. Especially when a thin sheet glass is to be used, it is preferred to employ a glass plate subjected to chemical tempering. When the transparent plate 2 is bonded to the transparent support via the first adhesive layer 4, the entire or a part of the transparent plate 2 may be curved, as described later. To prevent breakage of the transparent plate 2 on that occasion, a chemically tempered glass plate is preferably employed. As examples of the resin plate, a highly transparent resin material, such as polycarbonate or polymethyl methacrylate, may be mentioned.

The transparent plate 2 may be subjected to surface treatment to improve the interfacial adhesion to the first adhesive layer 4 and the second adhesive layer 5. The surface treatment method may, for example, be a method of treating the surface of the transparent plate 2 with a silane coupling agent or a method of forming a silicon oxide thin film by oxidizing flame by a flame burner.

The shape of the transparent plate 2 may be determined in accordance with the planar shape of the display device main body which is to be bonded, and is rectangular or oblong as an example as shown in FIG. 1. The thickness of the transparent plate 2 is preferably from about 0.1 to about 30 mm, more preferably from about 0.1 to about 20 mm, further preferably from about 0.2 to about 2.0 mm in the case of a glass plate, in view of mechanical strength, transparency, etc. In order that an observer does not strongly feel that display looks far at the back (i.e., a sense of depth), the thickness of the transparent plate 2 is more preferably from about 0.2 to about 0.7 mm. In the case of a resin plate, the thickness of the transparent plate 2 is preferably from about 0.1 to about 1.0 mm. In order that the observer does not strongly feel a sense of depth of the display, the thickness of the transparent plate 2 is more preferably from about 0.1 to about 0.3 mm.

(Light-Shielding Portion)

The light-shielding portion 3 has a function to shield attachments, such as a flexible printed wiring board connected to the display device main body, so that a region other than the image display region (a region outside the image display region) of the display device main body is not seen in a case where the adhesive layer-equipped transparent plate according to this embodiment is used for bonding between the display device main body and the transparent plate. In the case of this embodiment, the light-shielding portion 3 is bonded to the second surface 2b as a side to which the display device main body is to be bonded, between the two surfaces 2a and 2b of the transparent plate 2. The light-shielding portion 3 is formed, as shown in FIG. 1, in a frame form on the periphery along the four sides of the rectangular transparent plate 2 as observed from a normal direction of the first surface 2a of the transparent plate 2. The light-shielding portion 3 has an opening region 3h formed in an inner side thereof to substantially conform to the image display region of the display device main body when the display device main body is bonded. Although, in this embodiment, external light may enter via exposed portions 2c where the first surface and/or the second surface of the transparent plate 2 is exposed, it is possible to prevent the external light from being visible to an observer because the light-shielding portion 3 is formed to fully cover the exposed portions 2c as shown in FIG. 1.

In a case where the transparent plate 2 is a glass plate, it is preferred in view of high shielding properties to form the light-shielding portion 3 by a printing method, such as ceramic printing with a black pigment. In a case where the transparent plate 2 is a chemically tempered glass plate, the heating temperature of the transparent plate 2 at the time of printing may be lowered by using an organic material as a light-shielding ink. However, the light-shielding portion 3 may not necessarily be formed by a printing method. For example, a separately prepared light-shielding portion 3 may be bonded to the transparent plate 2. Further, the light-shielding portion 3 may be formed by various thin film formation methods.

(First Adhesive Layer)

The first adhesive layer 4 is to bond the adhesive layer-equipped transparent plate 1 to a transparent support, such as a window glass. As shown in FIG. 2, the first adhesive layer 4 is provided on the first surface 2a as a side to be bonded to the transparent support, between the two surfaces 2a and 2b of the transparent plate 2. The first adhesive layer 4 is constituted by a transparent resin sheet obtained by curing, e.g., the after-mentioned liquid photocurable resin composition. Further, a touch sensor (not shown) may be provided between the adhesive layer-equipped transparent plate 1 and the first adhesive layer 4.

As shown in FIG. 3, the first adhesive layer 4 does not cover the entire first surface 2a of the transparent plate 2 and is not provided on some regions of the first surface 2a. Specifically, the first surface 2a has two portions 2c with no first adhesive layer 4 formed therein in parts of a region along each of two opposing long sides of the oblong shape forming the planar shape. Thus, the transparent plate 2 has four portions 2c formed in the periphery of the first surface 2a so that the first surface 2a is exposed from the first adhesive layer 4. In this specification, the portions 2c where the first surface 2a is exposed from the first adhesive layer 4 in regions without the first adhesive layer 4, and portions 2c where the second surface 2b is exposed from the after-mentioned second adhesive layer 5 in regions without the second adhesive layer 5 are called exposed portions 2c. In FIG. 3, the first surface 2a has two exposed portions 2c formed along a long upper side thereof so as to be apart from each other. Likewise, the first surface 2a has two exposed portions 2c formed along a long lower side thereof so as to be apart from each other.

The width W of the exposed portions 2c (the size in a short side direction of the first surface) is about 1 to about 5 mm, for example. The length L of the exposed portions 2c (the size in a long side direction of the first surface) is about 10 to about 30 mm, for example. The dimensions of the exposed portions 2c is preferred to be determined to prevent a worker' fingers from being brought into substantial contact with the first adhesive layer 4 when he or she places his or her hand on an end surface 2f of the transparent plate 2 to handle the adhesive layer-equipped transparent plate 1. Although the shape of the exposed portions 2c is rectangular in this embodiment, the shape of the exposed portions may, for example, be another shape, such as a polygonal shape or a semicircular shape, or an irregular shape.

The first adhesive layer 4 may be obtained by curing a photocurable resin composition, a thermosetting resin composition, a photocurable and thermosetting resin composition, for example. The term "photocurable resin composition" means a resin composition that is curable by exposure. The term "thermosetting resin composition" means a resin composition that is curable by heat. The term "photocurable and thermosetting resin composition" means a resin composition that is curable by exposure and heat. The term "exposure" means light irradiation, such as an ultraviolet ray irradiation. The curable composition is preferably a photocurable resin composition because of being curable at a low temperature and having a high curing speed.

The shear storage modulus of the first adhesive layer 4 at 25° C. for a frequency of 1 Hz is preferably within a range of from $5 \times 10^2$ to $1 \times 10^7$ Pa, more preferably within a range of from $1 \times 10^3$ to $1 \times 10^6$ Pa. When the shear storage modulus of the first adhesive layer 4 is at least $5 \times 10^2$ Pa, the shape of the first adhesive layer 4 tends to be maintained. Further, when the shear storage modulus of the first adhesive layer 4 is at least $5 \times 10^2$ Pa, the transparent plate 2 and a member bonded to the second adhesive layer 5 on the transparent plate 2 can be sufficiently fixed to the transparent support, and at the time of bonding the adhesive layer-equipped transparent plate 1 and the transparent support, the first adhesive layer 4 will be less likely to be deformed by, e.g., the pressure at the time of bonding, such being desirable. On the other hand, when the shear storage modulus of the first adhesive layer 4 is at most $1\times10^7$ Pa, even if air bubbles are formed at the time of bonding the adhesive layer-equipped transparent plate 1 and the transparent support, such air bubbles will disappear in a short time and will be less likely to remain, such being desirable.

The thickness of the first adhesive layer 4 is preferably from about 0.1 to about 2.0 mm, more preferably from about 0.2 to about 1.0 mm. When the thickness of the first adhesive layer 4 is at least 0.1 mm, the first adhesive layer 4 will effectively absorb, e.g., a shock by an external force from the transparent support side, and can thereby protect the display device main body. Further, even if a foreign matter not exceeding the thickness of the first adhesive layer 4 is included between the transparent support and the adhesive layer-equipped transparent plate 1, the thickness of the first adhesive layer 4 will not change substantially, and there will be little influence to the light transmitting performance. When the thickness of the first adhesive layer 4 is at most 2.0 mm, it becomes easy to bond the transparent plate 2 to the transparent support via the first adhesive layer 4, and the entire thickness of the display device will not become unnecessarily thick.

The photocurable resin composition is preferably of a solvent-free type since it is not necessary to perform heating for removal of a solvent. The term "solvent-free type" means that no solvent is contained, or that the content proportion of a solvent is at most 5 mass % in the total mass of the photocurable resin composition (100 mass %). The term "solvent" means a liquid having a boiling point of at most 150° C. (volatile diluent). Most preferably, the photocurable resin composition contains no solvent in terms of eliminating a drying step and saving fabrication time and energy. The curable composition typically contains a curable compound having a curable compound (A) and a photopolymerization initiator (B). The curable composition may contain another non-curable component in addition to the photopolymerization initiator (B) as the case requires. As the non-curable component, a non-curable polymer (C), a chain transfer agent (D) and another additives may be mentioned.

As examples of the curable compound (A), an acrylic compound, a silicone compound, a urethane acrylate compound and an epoxy compound may be mentioned. Among them, a silicone compound or a urethane acrylate compound is preferred as the curable compound (A) because it is easy to control the storage modulus G' of the first adhesive layer 4 to a value from $5\times10^2$ to $1\times10^7$ Pa. Further, the curable compound (A) is more preferably a urethane acrylate one because it is easy to control the gel fraction of the first adhesive layer 4 to a value from 1 to 50%.

(Second Adhesive Layer)

The second adhesive layer 5 into bond the adhesive layer-equipped transparent plate 1 to the display device main body. The second adhesive layer 5 is provided on the second surface 2b as a side to which the display device main body is to be bonded, between the two surfaces 2a and 2b of the transparent plate 2. As described above, the second adhesive layer 5 has a smaller area than the first adhesive layer 4. Specifically, the second adhesive layer 5 is provided in a central portion of a rectangular shape as the planar shape of the second surface 2b without being provided on the periphery along the four sides of the rectangular shape, whereas the first adhesive layer 4 is provided on the entire first surface 2a except for the four exposed portions 2c.

The material constituting the second adhesive layer 5 may be the same as or different from the material constituting the first adhesive layer 4. Since the second adhesive layer 5 is bonded to a display panel of a display device, it is preferably bonded without voids under a smaller bonding pressure so as not to impair the display panel. Accordingly, a measure, such as a measure to increase the content of the non-curable component in the curable compound, or a measure to adjust the content of the chain transfer agent, may be adopted. Further, the second adhesive layer 5 may contain an ultraviolet absorber in a smaller amount than the first adhesive layer 4 since external light which has been transmitted through the first adhesive layer 4 and the transparent plate 2 enters the second adhesive layer.

The thickness of the second adhesive layer 5 may be the same as or different from that of the first adhesive layer 4. Specifically, the second adhesive layer 5 may be thinner than the first adhesive layer 4, and the thickness of the second adhesive layer 5 may be about half the thickness of the first adhesive layer 4. The reason is that the second adhesive layer 5 interposed between the display device main body and the transparent plate is not required to have shock-absorbing properties at the same level as the first adhesive layer 4 interposed between the transparent plate and a transparent support, such as a window glass.

The shear storage modulus of the second adhesive layer 5 may be the same as or different from that of the first adhesive layer 4. Since the second adhesive layer 5 is directly in contact with the display device, it is preferred to take a measure to use a material capable of forming an adhesive layer with a smaller shear storage modulus, or a measure to make the second adhesive layer 5 thick, in a case where the uniformity of the display image may be impaired by bonding the transparent plate to a display surface, such as a case of an IPS mode liquid crystal display device.

As shown in FIG. 2, the second adhesive layer 5 is provided on both a region surrounded by the frame-form light-shielding portion 3 and a region planarly overlapping with a part of the light-shielding portion 3, on the second surface 2b of the transparent plate 2. Since the second adhesive layer 5 is bonded to a portion corresponding to the image display region of the display device main body, it may be provided only on the region surrounded by the light-shielding portion 3, i.e. a region on the inner side of the light-shielding portion 3. However, in a case where the second adhesive layer 5 planarly overlaps with a part of the light-shielding portion 3 as in this embodiment, the region where the second adhesive layer 5 planarly overlaps with a part of the light-shielding portion 3 functions as an alignment margin at the time of position adjustment between the second adhesive layer 5 and the light-shielding portion 3. Accordingly, even if the second adhesive layer 5 and the light-shielding portion 3 are somewhat misaligned, the second adhesive layer 5 will readily be formed on the region surrounded by the light-shielding portion 3. Thus, the display device main body is fixed to the transparent plate 2 with a sufficiently high strength, and in addition, the edge of the second adhesive layer 5 is shielded by the light-shielding portion 3, whereby a decrease in the display quality by the sight of the edge of the second adhesive layer 5 will not occur.

(First Protective Film and Second Protective Film)

The first protective film 6 is to protect the first adhesive layer 4 when the adhesive layer-equipped transparent plate 1 is not in use, and the first protective film is peeled from the first adhesive layer 4 when the adhesive layer-equipped transparent plate is used. Likewise, the second protective film 7 is to protect the second adhesive layer 5 when the adhesive layer-equipped transparent plate 1 is not in use, and the second protective film is peeled from the second adhesive layer 5 when the adhesive layer-equipped transparent plate is used. Accordingly, the first protective film 6 and the second protective film 7 are required not to be strongly contact-bonded to the first adhesive layer 4 or the second adhesive layer 5. From such a viewpoint, it is preferred to use, as the first protective film 6 and the second protective film 7, a protective film including a base film having a relatively low adhesion to the first adhesive layer or the second adhesive layer and made of polyethylene, polypropylene, a fluorinated resin or the like, for contact with the first adhesive layer 4 or the second adhesive layer 5.

The adhesion on the adhesive face of each of the first protective film 6 and the second protective film 7 is preferably from 0.01 to 1 N, more preferably from 0.02 to 0.6 N, with a test specimen having a width of 50 mm in 180° peel test at a peel rate of 300 mm/min with respect to an acrylic plate. The suitable thickness of each of the first protective film 6 and the second protective film 7 varies depending upon a resin used, and is preferably from 0.03 to 0.2 mm, more preferably from 0.06 to 0.1 mm in a case of using a relatively flexible film of, e.g., polyethylene or polypropylene. When the thickness is at least 0.04 mm, deformation of the protective film can be reduced when the protective film is peeled from the adhesive layer. When the thickness is at most 0.2 mm, the protective film is likely to sag at the time of peeling and is easily peeled.

In order that the first and second protective films are more easily peeled from the first adhesive layer 4 and the second adhesive layer 5, a release agent, such as silicone, may be applied to the first protective film 6 and the second protective film 7 within a range not to impair the first adhesive layer 4 and the second adhesive layer 5. It is preferred to use, as the first protective film 6 and the second protective film 7, protective films having a larger size than the transparent plate 2, in order that the edges of the first protective film 6 and the second protective film 7 are easily held when the first and second protective films are peeled from the first adhesive layer 4 and the second adhesive layer 5.

(Display Device)

Figure 4:
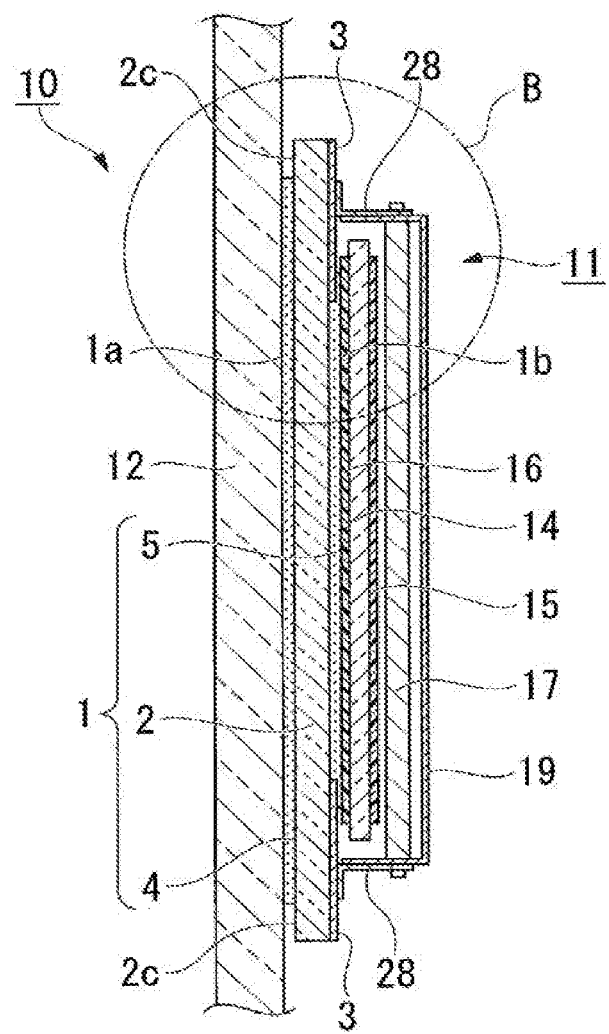
FIG. 4 is a cross-sectional view illustrating a display device including the adhesive layer-equipped transparent plate according to the first embodiment.
Figure 5:
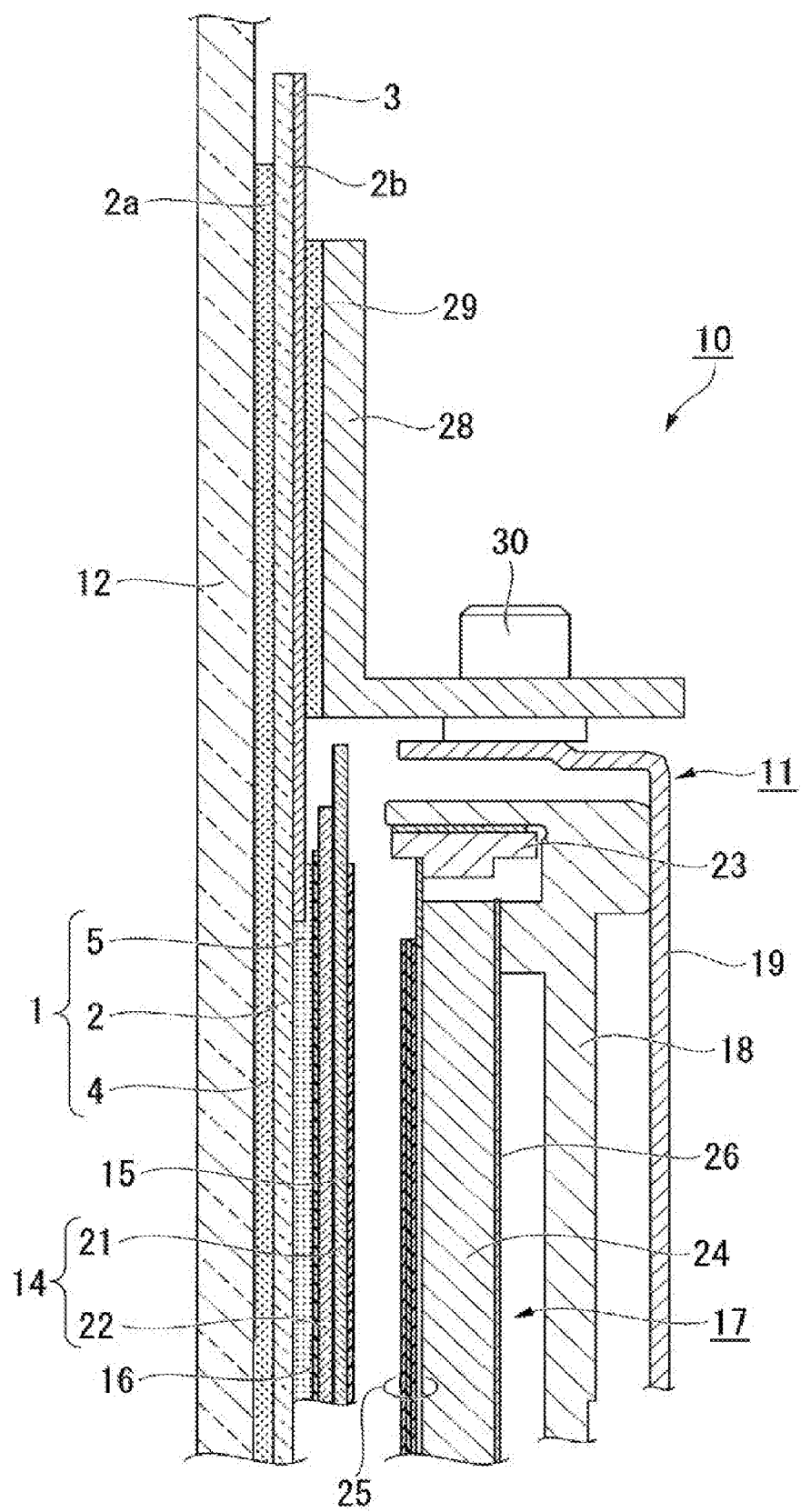
FIG. 5 is an enlarged cross-sectional view of the portion B in FIG. 4.

FIG. 4 is a cross-sectional view illustrating a display device including the adhesive layer-equipped transparent plate 1 according to the first embodiment. FIG. 5 is an enlarged cross-sectional view of the portion B in FIG. 4.

As shown in FIGS. 4 and 5, the display device 10 according to the first embodiment includes the display device main body 11, the adhesive layer-equipped transparent plate 1 and the transparent support 12. The transparent support 12 is bonded to a first surface 1a of the adhesive layer-equipped transparent plate 1 having the first adhesive layer 4 provided thereon. The display device main body 11 is bonded to a second surface 1b of the adhesive layer-equipped transparent plate 1. In the first embodiment, there is no particular limitation to the transparent support so long as the transparent support has a certain supporting force. The transparent support 12 may be a window glass used in, e.g., a store or an office. The display device main body 11 is, e.g., a liquid crystal display device. The adhesive layer-equipped transparent plate 1 has the first protective film 6 and the second protective film 7 peeled from the adhesive layer-equipped transparent plate 1 shown in FIG. 2. The transparent plate 2 is bonded to the transparent support 12 via the first adhesive layer 4. The display device main body 11 is bonded to the transparent plate 2 via the second adhesive layer 5. Further, an adhesive layer-equipped transparent plate 1 having a touch sensor (not shown) provided on the transparent support 12 side of the transparent plate 2 may be used. In such a case, the display device 10 may be operated by touching the display device 10 from the outside of the transparent support 12. In such a case, the transparent support 12 may be a lenticular sheet. The lenticular sheet is commonly configured to have a lenticular lens provided on a surface to which light enters (the first adhesive layer 4 side) and, in order to spread display light in a perpendicular direction, to have a diffusion sheet laminated on a surface from which light emits (observer' side). It becomes possible to control the expansion of a display image and further provide a stereoscopic effect to the display image by using such a lenticular sheet as the transparent support 12.

As shown in FIG. 5, the display device main body 11 includes a liquid crystal panel 14, a pair of polarizing plates 15 and 16, a backlight 17 (lighting unit), a frame 18 and a case 19. The liquid crystal panel 14 includes a pair of glass substrates 21 and 22, and a liquid crystal (not shown) sealed in between the glass substrates 21 and 22. The drive system of the liquid crystal panel 14 is not particularly limited, and for example, a liquid crystal panel driven by transverse field, such an in-plane switching mode may be mentioned. The pair of glass substrates 21 and 22 includes a TFT element substrate equipped with a thin film transistor (TFT) and a color filter substrate equipped with a color filter.

The polarizing plates 15 and 16 are bonded to both the surfaces of the liquid crystal panel 14 to sandwich the liquid crystal panel 14 therebetween. Further, an optical film, such as a wave plate, may be disposed between the liquid crystal panel 14 and each of the polarizing plates 15 and 16. The polarizing plate 16 on the opposite side from the backlight 17, between the polarizing plates 15 and 16, is bonded to the transparent plate 2 via the second adhesive layer 5, whereby the liquid crystal panel 14 is fixed to the transparent support 12.

The backlight 17 includes a light-emitting device 23, such as a light-emitting diode (LED), a light guide plate 24, a plurality of optical films 25, such as a prism sheet and a light diffusion sheet, and a mirror 26. Light emitted from the light emitting device 23 is reflected on the mirror 26 while it enters the light guide plate 24 and is emitted via the optical films 25 toward the liquid crystal panel 14. The optical films 25 have a function to equalize the intensity of light emitted from the light guide plate 24. Accordingly, the optical films 25 and the liquid crystal panel 14 are disposed, being apart from each other.

Since the liquid crystal panel 14 is relatively light in weight, it is supported on the transparent support 12 by bonding the image display region portion of the liquid crystal panel 14 to the transparent support 12 via the adhesive layer-equipped transparent plate 1. However, because the backlight 17 is heavy, even if the liquid crystal panel 14 and the backlight 17 are fixed, the entire display device main body 11 can hardly be supported on the transparent support 12 only by bonding the liquid crystal panel 14 to the transparent support 12. From this point of view, it is preferred to make the backlight 17 among the members constituting the display device main body 11, supported on the transparent support 12 separately from the liquid crystal panel 14.

As a member to support the backlight 17 on the transparent support 12, in the case of the first embodiment, the backlight 17 is fixed to the adhesive layer-equipped transparent plate 1 by an angle 28 (support member) with an L-shaped cross section. More specifically, the angle 28 to fix the backlight 17 is fixed to the light-shielding portion 3 on the second surface 2b of the transparent plate 2 by a double-coated adhesive tape 29. The backlight 17 is fixed to the frame 18, and the frame 18 is fixed to the case 19. The case 19 is fixed to the angle 28 by a bolt 30. By the above constitution, the backlight 17 is fixed to the transparent support 12 via the adhesive layer-equipped transparent plate 1. It is possible to firmly fix the display device main body 11 including the backlight 17 by adopting an arrangement that the angle 28 is fixed to the light-shielding portion 3 by the double-coated adhesive tape 29 with the light-shieling portion 3 being partly exposed as mentioned above.

As a procedure to bond the display device main body 11 to the transparent support 12, the first protective film 6 is peeled from the adhesive layer-equipped transparent plate 1, the adhesive layer-equipped transparent plate 1 is bonded to the transparent support 12, and then the second protective film 7 is peeled, and the display device main body 11 is bonded to the adhesive layer-equipped transparent plate 1 bonded to the transparent support 12. Otherwise, the second protective film 7 is peeled from the adhesive layer-equipped transparent plate 1, the adhesive layer-equipped transparent plate 1 is bonded to the display device main body 11, and then the first protective film 6 is peeled, and the display device main body 11 with the adhesive layer-equipped transparent plate 1 bonded thereto is bonded to the transparent support 12.

At the time of bonding to the transparent support 12, the adhesive layer-equipped transparent plate 1, or the adhesive layer-equipped transparent plate 1 with the display device main body 11 bonded thereto may be bonded while it is curved entirely or locally. In such a case, it is preferred to bond the adhesive layer-equipped transparent plate 1 alone to the transparent support 12 first, since the adhesive layer-equipped transparent plate 1 is easily curved.

On the other hand, in some cases, the display device main body 11 bonded to the transparent support 12 is to be peeled from the transparent support 12. In such a case also, the bonded object is peeled while it is curved in some cases, and the display device main body 11 may be peeled from the adhesive layer-equipped transparent plate 1 first and then the adhesive layer-equipped transparent plate 1 may be peeled from the transparent support 12. Accordingly, the interfacial adhesive strength between the first adhesive layer 4 and the transparent support 12 and the interfacial adhesive strength between the first adhesive layer 4 and the transparent plate 2 are preferably larger than those between the second adhesive layer and the display device main body 11 and between the second adhesive layer and the transparent plate 2. Otherwise, the adhesive layer-equipped transparent plate 1 with the display device main body 11 bonded thereto first may be peeled from the transparent support 12, following peeling the adhesive layer-equipped transparent plate 1 from the display device main body 11.

Further, it is preferred that after the adhesive layer-equipped transparent plate 1 is peeled, the first adhesive layer 4 will not remain on the transparent support 12, and the transparent support 12, i.e., a window glass will be restored to its original state before the display device main body 11 is bonded. Accordingly, the interfacial adhesive strength between the first adhesive layer 4 and the transparent support 12 is preferably smaller than that between the first adhesive layer 4 and the transparent plate 2. In order to realize such a degree of the adhesive forces, the adhesive forces may be adjusted by the proportions of monomer components in the curable compound (A), and the contents of the non-curable component and the chain transfer agent, as materials constituting the first adhesive layer 4 and the second adhesive layer 5. In a case where an object to be bonded is a glass plate, the interfacial adhesive strength can be increased by a measure to, for example, reduce the content of the non-curable component. Further, the adhesive strength to a glass surface can be also increased by increasing the content of the chain transfer agent.

(Function and Effect)

In the adhesive layer-equipped transparent plate 1 according to the first embodiment, the transparent plate 2 has the two exposed portions exposed portions 2c formed along each of the two opposing long sides of the first surface 2a so as to be apart from each other. Accordingly, when the operation for bonding the adhesive layer-equipped transparent plate 1 to the transparent support 12 is performed, it is possible to increase the workability and easy to perform the bonding operation in comparison with before. For example when a large size of adhesive layer-equipped transparent plate 1 is bonded to a window glass, it is assumed that two workers hold the adhesive layer-equipped transparent plate 1 by hands, directing the first surface 2a downward. In this case, a worker holds the adhesive layer-equipped transparent plate 1 so as to catch, with his or her fingers, the two righthand exposed portions 2c shown in FIG. 3, and the other worker holds the adhesive layer-equipped transparent plate 1 so as to catch, with his or her fingers, the two lefthand exposed portions 2c shown in FIG. 3, whereby it is possible to reduce the possibility of adherence of the adhesive to the workers' hands and to increase the workability. Thus, the adhesive layer-equipped transparent plate 1 according to the first embodiment can improve handling performance during transport or working in comparison with the conventional adhesive layer-equipped transparent plates.

Further, even when the operation for peeling the adhesive layer-equipped transparent plate 1 from the transparent support 12 is performed, it is possible to improve the workability and to easily perform the peeling operation in comparison with before. For example, since the conventional adhesive layer-equipped transparent plates have had a first adhesive layer 4 provided entirely on a first surface 2a of a transparent plate 2, there has been no clearance between the transparent plate 1 and the transparent support 12 where a work places a jig or his or her fingers for the peeling operation. It has been troublesome and has taken much time to perform the peeling operation. In contrast, since the exposed portions 2c provide clearances between the transparent plate 1 and the transparent support 12 according to the conventional adhesive layer-equipped transparent plate 1 according to the first embodiment, a worker can place a jig or his or her fingers into the clearances to peel the adhesive layer-equipped transparent plate 1 from the transparent support 12.

The display device 10 according to this embodiment includes the above-mentioned adhesive layer-equipped transparent plate 1, the transparent support 12 and the display device main body 11, resulting in being excellent in display quality.

Further, in the display device 10 according to the first embodiment, since the light-shielding portion 3 surrounding the image display region is provided on the adhesive layer-equipped transparent plate 1, accessary parts, such as wiring members connected to the liquid crystal panel 14, can be shielded without newly providing a light-shielding portion. Particularly in the first embodiment, since the light-shielding portion 3 is provided on the second surface 2b of the transparent plate 2, the distance between the light-shielding portion 3 and the image display surface in a depth direction is short. Thus, an observer will not feel that display looks far at the back with respect to a frame portion consisting of the light-shielding portion 3, and a decrease in visibility of the display by a difference in level of the frame portion and the image display surface can be prevented.

It should be noted that instead of the arrangement according to the first embodiment, for example, the second adhesive layer 5 may be provided on the entire second surface 2b of the transparent plate 2. Even in this case, it is possible to improve handling performance so long as the transparent plate 2 has exposed portions provided on the first surface 2a as in the above-mentioned first embodiment.

Second Embodiment

Now, a second embodiment of the present invention will be described with reference to FIGS. 6 to 8.

The adhesive layer-equipped transparent plate according to the second embodiment is basically configured in the same manner as the one according to the first embodiment and is different from the one according to the first embodiment in the arrangement of exposed portions.

Figure 6:
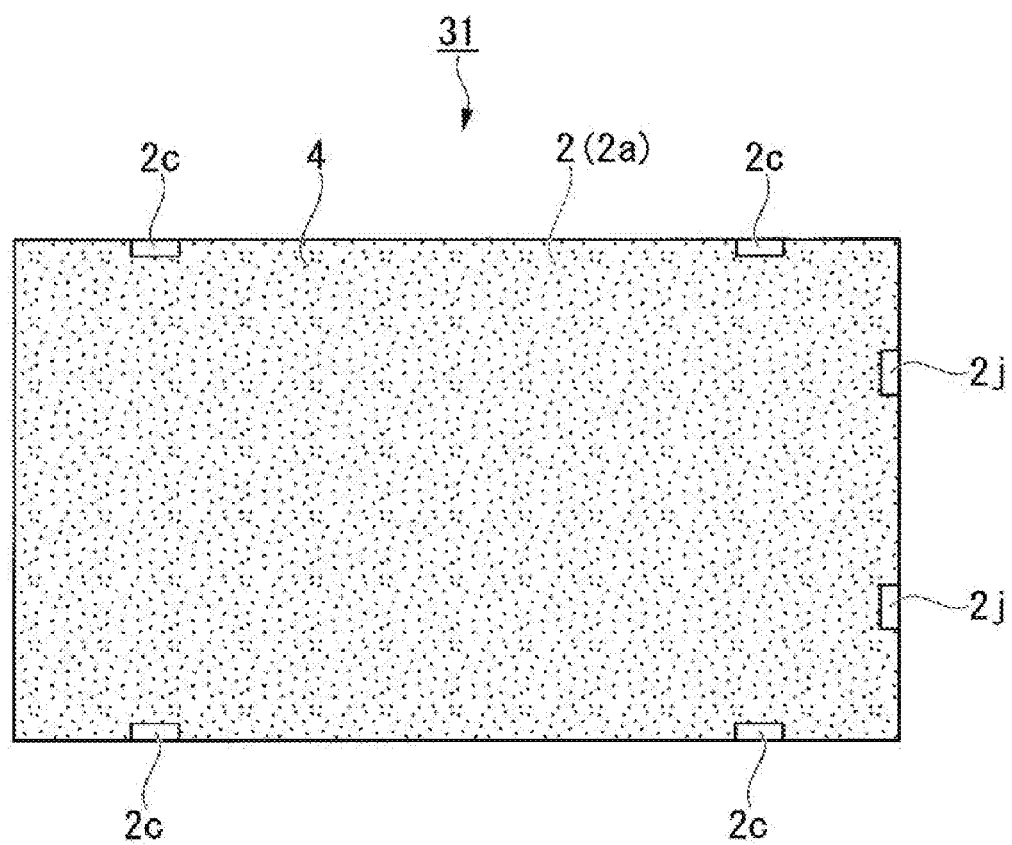
FIG. 6 is a plan view illustrating the adhesive layer-equipped transparent plate according to a second embodiment of the present invention as observed from a first surface side.

FIG. 6 is a plan view illustrating the adhesive layer-equipped transparent plate according to the second embodiment as observed from a first surface side. FIG. 6 also illustrates a state where a first protective film and a second protective film have been peeled from the adhesive layer-equipped transparent plate. FIG. 7 is a schematic view illustrating an example of the method for binding the adhesive layer-equipped transparent plate to a transparent support. FIG. 8 is a schematic view illustrating another example of the method for bonding the adhesive layer-equipped transparent plate to the transparent suppose.

Figure 7:
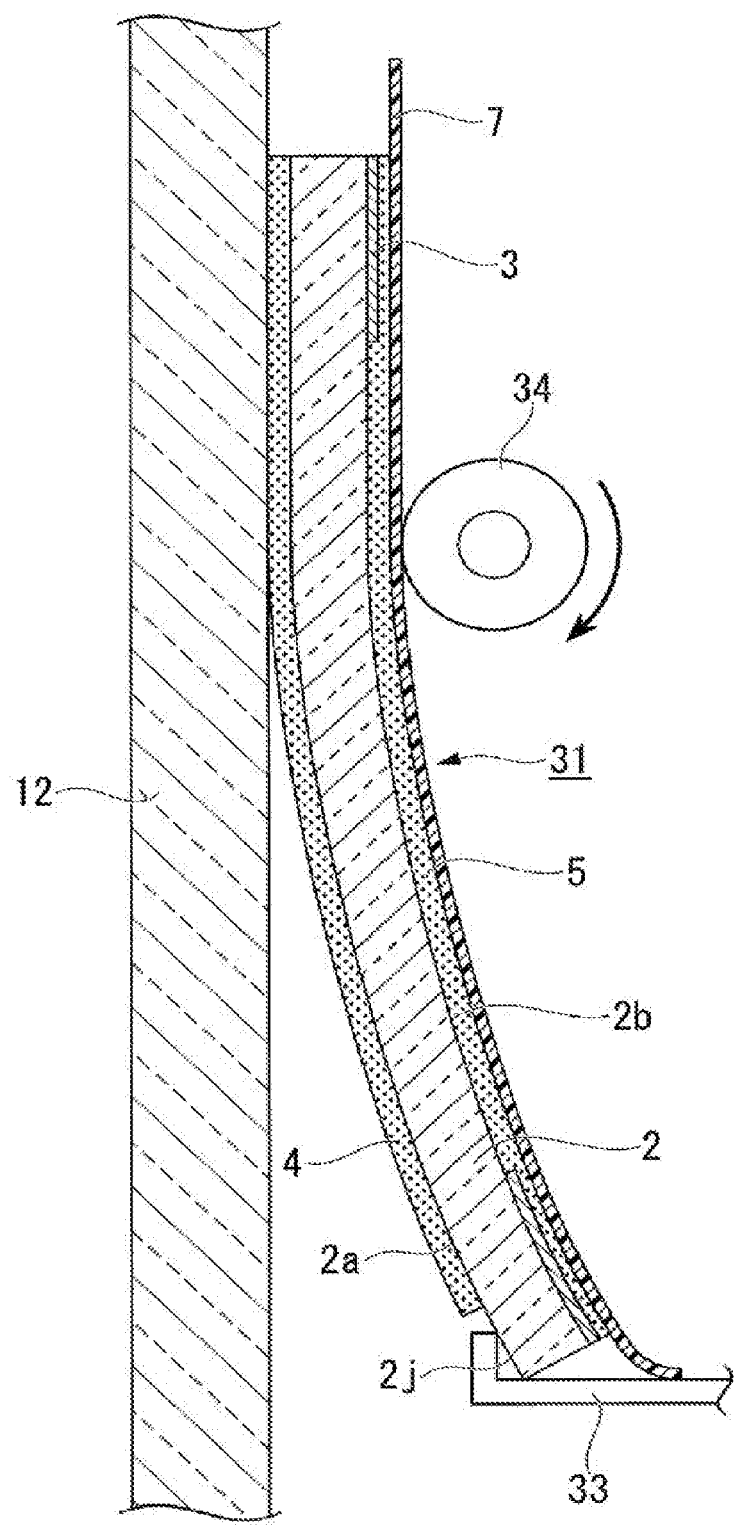
FIG. 7 is a schematic view illustrating an example of the method for bonding the adhesive layer-equipped transparent plate to a transparent support.
Figure 8:
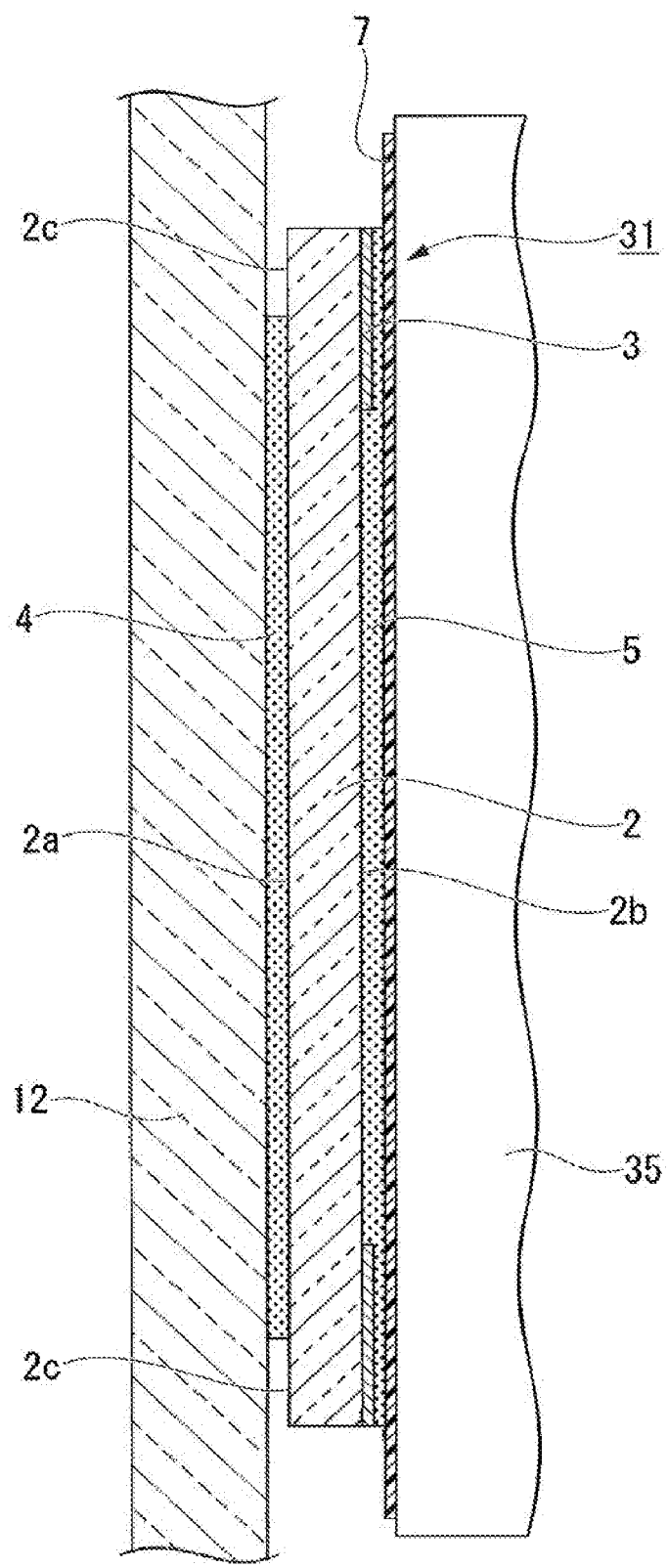
FIG. 8 is a schematic view illustrating another example of the method for bonding the adhesive layer-equipped transparent plate to a transparent support.

In FIGS. 6 to 8, components common to the ones used in the first embodiment and shown in the relevant figures are represented by the same symbols, and their detailed description will be omitted.

As shown in FIG. 6, the adhesive layer-equipped transparent plate 31 according to the second embodiment has two exposed portions 2c provided along each of two long sides of a first surface 2a of a transparent plate 2 so as to be apart from each other. Further, the transparent plate 2 has two exposed portions 2j provided along one of the short sides of the first surface 2a thereof so as to be apart from each other. The form and dimensions of the exposed portions 2j along the one short side may be the same as or different from those of the exposed portions 2c along the long sides. The other features of the adhesive layer-equipped transparent plate 31 are the same as the ones according to the first embodiment.

As one example of the method for bonding the adhesive layer-equipped transparent plate 31 to the transparent support 12, is mentioned a method for bonding the adhesive layer-equipped transparent plate 31 to the transparent support 12, pressing the adhesive layer-equipped transparent plate against the transparent support in a state where the adhesive layer-equipped transparent plate 31 is bent, being supported by an arbitrary measure, as shown in FIG. 7. In the example shown in FIG. 7, the adhesive layer-equipped transparent plate 31 is bonded to the transparent support 12 from one edge of the first surface 2a first, and then is fully bonded to the transparent plate 12, being pressed against the transparent support by holding the other edge of the first surface 2a by a holder 33 to keep the other edge out of touch from the transparent support 12 and moving a roller 34 in a long side direction of the first surface from the one edge to the other edge.

According to such method, it is possible to minimize the entry of air bubbles into the interface between the adhesive layer-equipped transparent plate 31 and the transparent support 12 to uniformly bond the adhesive layer-equipped transparent plate 31 to the transparent support 12. It should be noted that the direction to move the roller 34 may be either one of the long side direction and the short side direction of the adhesive layer-equipped transparent plate 31, and that the direction is preferred to be the long side direction of the adhesive layer-equipped transparent plate 31 from the viewpoint of easy bending of the adhesive layer-equipped transparent plate 31.

In the adhesive layer-equipped transparent plate 31 according to the second embodiment, it is possible to improve the handling performance of the adhesive layer-equipped transparent plate 31 as in the first embodiment since the transparent plate 2 has the two exposed portion 2c provided along each of the two opposing long sides of the first surface 2a as in the first embodiment.

Further, since the transparent plate 2 has the two exposed portions 2j provided along one of the short sides of the first surface 2a, it is possible to reduce the possibility of adherence of the adhesive to the holder 33 at the time of hooking the holder 33 on the exposed portions 2j as shown in FIG. 7. Thus, it is possible to easily perform the bonding operation by use of the above-mentioned method.

Further, even when the adhesive layer-equipped transparent plate 31 is peeled from the transparent support 12, the adhesive layer-equipped transparent plate 31 can be peeled from the transparent support 12 by placing a jig or fingers on the exposed portions 2c and 2j and applying forces to bend the adhesive layer-equipped transparent plate. In this case also, it is possible to minimize the possibility of adherence of the adhesive to the jig or fingers and to easily perform the peeling operation.

As another example of the method for bonding the adhesive layer-equipped transparent plate 31 to a transparent support, is mentioned a method for bonding the adhesive layer-equipped transparent plate 31 to the transparent support 12 by sucking or chucking the adhesive layer-equipped transparent plate 31 by a sucking or chucking jig 35 and pressing the adhesive layer-equipped transparent plate 31 as well as the sucking or chucking jig 35 to the transparent support 12 as shown in FIG. 8. When the sucking or chucking jig 35 is used, according to the method for chucking the adhesive layer-equipped transparent plate 31 by the sucking or chucking jig 35, the provision of the exposed portions 2c on the first surface 2a of the transparent plate 2 is preferred in some cases, and the provision of the exposed portions on the second surface 2b of the transparent plate 2 is preferred in the other cases.

When the adhesive layer-equipped transparent plate 31 is sucked or chucked to the sucking or chucking jig 35, there are a method where a worker places the adhesive layer-equipped transparent plate 31 on, e.g., a desk and brings the sucking or chucking jig 35 into contact with the adhesive layer-equipped transparent plate 31 from upward, and a method where a worker places the sucking or chucking jig 35 on, e.g., a desk and places the adhesive layer-equipped transparent plate 31 on the sucking or chucking jig 35.

In the former case, it is preferred to provide the exposed portions 2c on the opposite side of the adhesive layer-equipped transparent plate 31 from a side with the sucking or chucking jig 35 placed thereon, i.e., on the first surface 2a of the transparent plate 2 as shown in FIG. 8 because the holder, fingers or the like are brought into contact with a lower side of the adhesive layer-equipped transparent plate 31 when the adhesive layer-equipped transparent plate 31 is placed on the desk. In contrast, in the latter case, it is preferred to provide the exposed portions on the opposite side of the adhesive layer-equipped transparent plate 31 from a side with the sucking or chucking jig 35 placed thereon, i.e., the second surface 2b of the transparent plate 2 because the holder, fingers or the like are brought into contact with the lower side of the adhesive layer-equipped transparent plate 31 when the adhesive layer-equipped transparent plate 31 is placed on the sucking or chucking jig 35.

In either method, it is preferred to provide the exposed portions 2c and 2j at least on the opposite side of the adhesive layer-equipped transparent plate 31 from a side with the sucking or chucking jig 35 placed thereon (on a side to have contact with the transparent support 12), i.e., the first surface 2a of the transparent plate 2, taking easy peeling operation also into consideration.

Third Embodiment

Now, a third embodiment of the present invention will be described with reference to FIG. 9.

The adhesive layer-equipped transparent plate according to the third embodiment is basically configured in the same manner as the one according to the first embodiment and different from the one according to the first embodiment in terms of the arrangement of exposed portions.

Figure 9:
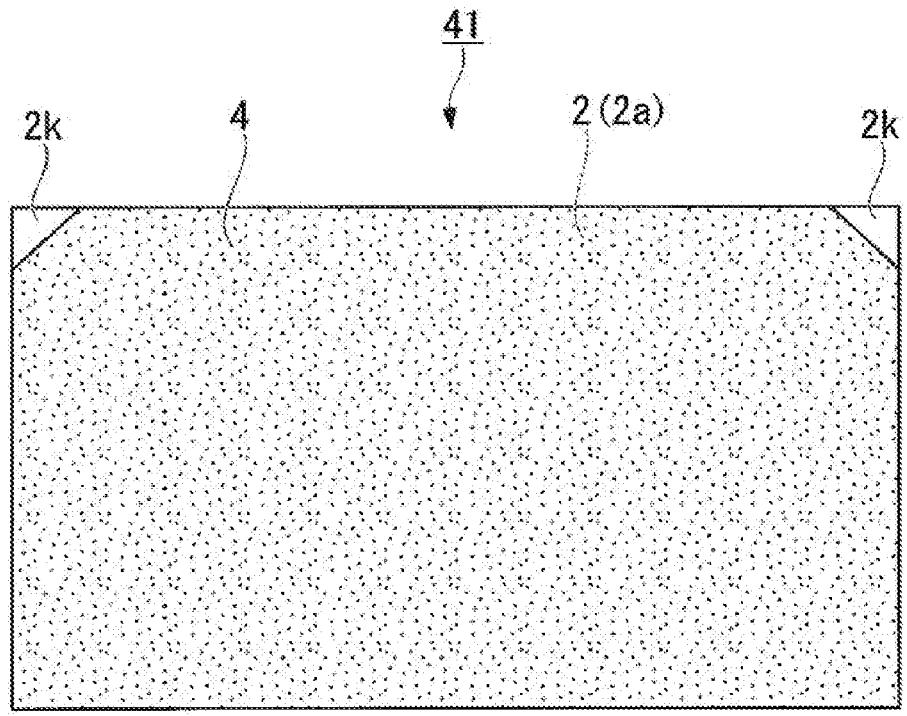
FIG. 9 is a plan view illustrating the adhesive layer-equipped transparent plate according to a third embodiment of the present invention as observed from a first surface side.

FIG. 9 is a plan view illustrating the adhesive layer-equipped transparent plate according to the third embodiment as observed from a first surface side. FIG. 9 also illustrates a state where a first protective film and a second protective film are peeled from the adhesive layer-equipped transparent plate.

In FIG. 9, components common to the ones used in the first embodiment and shown in the relative figures are represented by same symbols, and their detailed description will be omitted.

As shown in FIG. 9, the adhesive layer-equipped transparent plate 41 according to the third embodiment has exposed portions 2k provided in two respective corners of the four corners of a first surface 2a of a transparent plate 2, which are located across a long side. Each of the exposed portions 2k is formed in a triangle shape surrounded by the long side and the short side forming the relevant corner, and a straight line at an angle of 45° to both sides. It should be noted that the shape of the exposed portions 2k is not limited to a triangle, and that the shape may be another shape, such as a rectangular shape or fan shape. Further, there is no particular limitation to the dimensions of the exposed portions 2k. The other features of the adhesive layer-equipped transparent plate 41 are the same as those of the adhesive layer-equipped transparent plate according to the first embodiment.

Since the adhesive layer-equipped transparent plate 41 according to the third embodiment has the exposed portions 2k provided in two corners of the first surface 2a of the transparent plate 2, which are located across one long side, a worker can place a jig or fingers on these exposed portions 2k to apply a force to the adhesive layer-equipped transparent plate, improving workability at the time of, in particular, performing the peeling operation.

Fourth Embodiment

Now, a fourth embodiment of the present invention will be described with reference to FIGS. 10 and 11.

The adhesive layer-equipped transparent plate according to the fourth embodiment is basically configured in the same manner as that according to the first embodiment and is different from that of first embodiment in terms of the arrangement of an exposed portion.

Figure 10:
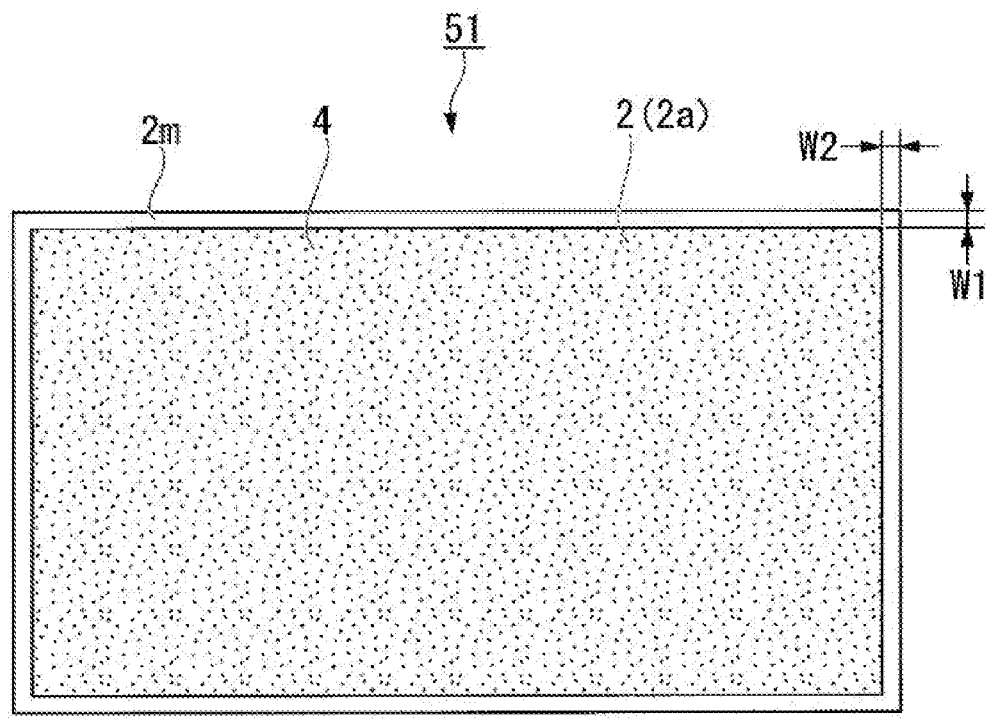
FIG. 10 is a plan view illustrating the adhesive layer-equipped transparent plate according to a fourth embodiment of the present invention as observed from a first surface side.
Figure 11:
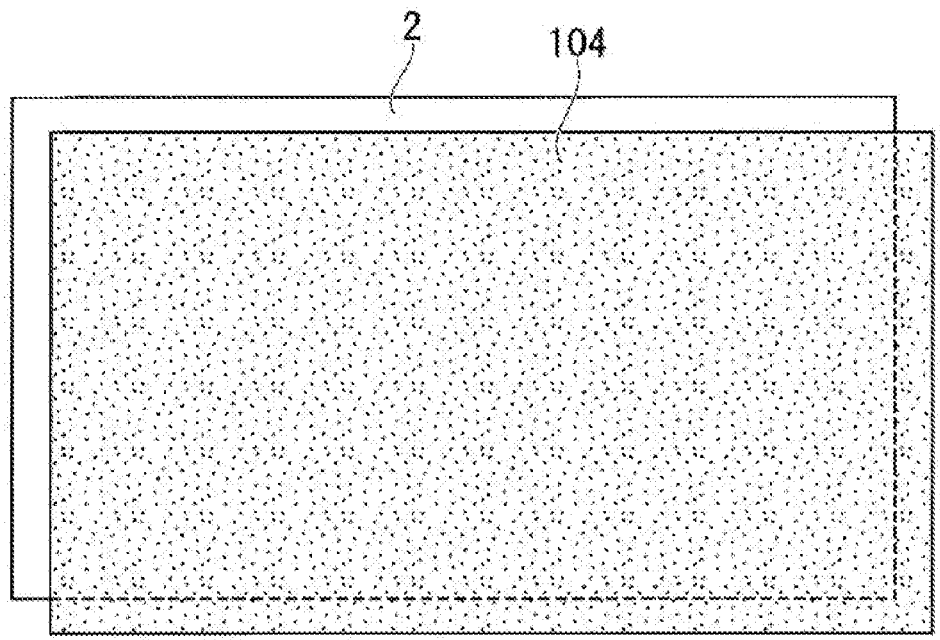
FIG. 11 is a schematic view illustrating a problem during production of a conventional adhesive layer-equipped transparent plate.

FIG. 10 is a plan view illustrating the adhesive layer-equipped transparent plate according to the fourth embodiment as observed from a first surface side. FIG. 10 also illustrates a state where a first protective film and a second protective film have been peeled from the adhesive layer-equipped transparent plate.

In FIG. 10, components common to those used in the first embodiment and shown in the relevant figures are represented by the same symbols, and their detailed description will be omitted.

As shown in FIG. 10, the adhesive layer-equipped transparent plate 51 according to the fourth embodiment has an exposed portions 2m provided in a region along the four sides of a first surface 2a of a transparent plate 2. The width of the exposed portion 2m may be formed such that the width W1 of a part of the exposed portion along a long side is the same as or different from and the width W2 of a part of the exposed portion along a short side. The other features of the adhesive layer-equipped transparent plate 51 are the same as that of the adhesive layer-equipped transparent plate according to the first embodiment.

According to this embodiment also, it is possible to have the same effects as in the first to the third embodiments, such as improvement in the handling performance of the adhesive layer-equipped transparent plate 51, and easy bonding operation and peeling operation for the adhesive layer-equipped transparent plate 51.

Further, the adhesive layer-equipped transparent plate 51 according to the fourth embodiment has advantageous effects as described below. When the adhesive layer-equipped transparent plate 51 is produced, a first adhesive layer 4 made of a transparent resin sheet is separately fabricated, and the first adhesive layer 4 is bonded to a transparent plate 2 as described with respect to the first embodiment. Supposing that no exposed portion is provided as shown in FIG. 11, when misalignment between a first adhesive layer 104 and a transparent plate 2 is caused at a time of bonding the first adhesive layer 104 to the transparent plate 2 since the first adhesive layer 104 and the transparent plate 2 have the same dimensions, the misalignment causes a problem that the first adhesive layer 104 protrudes outward from the transparent plate 2.

In contrast, the adhesive layer-equipped transparent plate 51 according to the fourth embodiment has the exposed portion 2m provided in a region along the four sides of the first surface 2a of the transparent plate 2. According to this arrangement, even if misalignment between the first adhesive layer 4 and the transparent plate 2 is caused in any one of a long side direction, a short side direction and a rotation direction at a time of bonding the first adhesive layer 4 to the transparent plate 2, the first adhesive layer 4 is prevented from protruding outward from the transparent plate 2 so long as the widths W1 and W2 of the exposed portion 2m are set at values exceeding alignment error between the first adhesive layer 4 and the transparent plate 2. Even if not only the misalignment between the first adhesive layer 4 and the transparent plate 2 but also dimensional error between the first adhesive layer 4 and the transparent plate 2 is caused, this arrangement can reduce the possibility that the first adhesive layer 4 could protrude outward from the transparent plate 2. These effects improve the productivity of the adhesive layer-equipped transparent plate 51.

Fifth Embodiment

Now, a fifth embodiment of the present invention will be described with reference to FIGS. 12 and 13.

Figure 12:
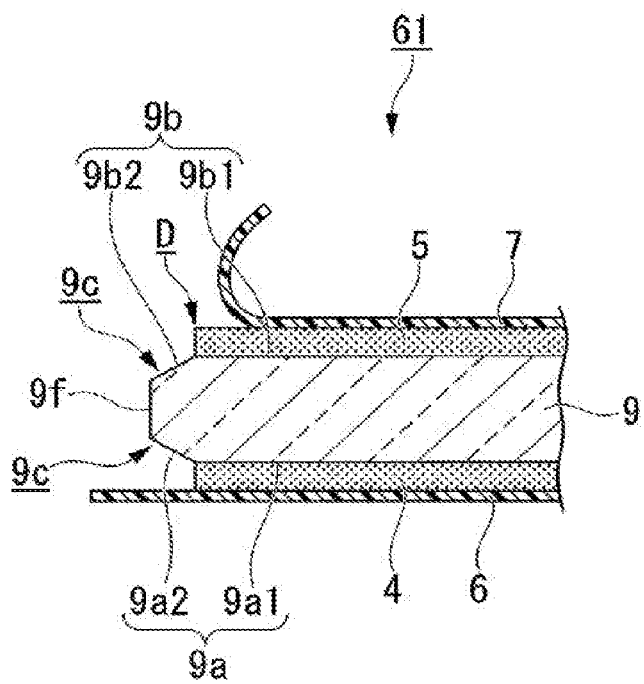
FIG. 12 is a cross-sectional view illustrating the adhesive layer-equipped transparent plate according to a fifth embodiment of the present invention.
Figure 13:
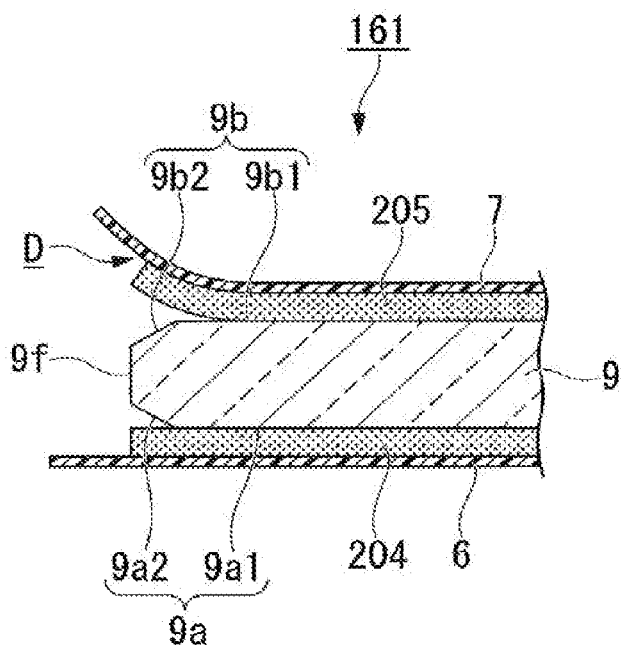
FIG. 13 a schematic view illustrating another problem during production of a conventional adhesive layer-equipped transparent plate.

The adhesive layer-equipped transparent plate according to the fifth embodiment is basically configured in the same manner as that according to the first embodiment and is different from that according to the first embodiment in terms of the arrangements of a transparent plate and exposed portions FIG. 12 is a cross-sectional view illustrating the adhesive layer-equipped transparent plate according to the fifth embodiment.

In FIG. 12, components common to those used in the first embodiment and shown in the relevant figures are represented by the same symbols, and their detailed description will be omitted.

As shown in FIG. 12, the adhesive layer-equipped transparent plate 61 according to the fifth embodiment includes a transparent plate 9, which has a first surface 9a including a first flat surface 9a1 locating at a central area on the transparent plate 9, and a first inclined surface 9a2 inclining to the first flat surface 9a1 in the periphery of the transparent plate 9 and having contact with an end surface 9f perpendicular to the first flat surface 9a1. Likewise, the transparent plate 9 has a second surface 9b including a second flat surface 9b1 locating at a central area on the transparent plate 9, and a second inclined surface 9b2 inclining to the first flat surface 9b1 in the periphery of the transparent plate 9 and having contact with the end surface 9f perpendicular to the second flat surface 9b1. In other words, each of the corners formed by the end surface 9f, and the first surface 9a and the second surface 9b of the transparent plate 9 is chamfered in a planar shape. It should be noted that although the corners chamfered in a planar shape are exemplified, the transparent plate 9 may have corners chamfered in a curved and round shape.

In this embodiment, the transparent plate 9 has exposed portions 9c provided on the first inclined surface 9a2 and the second inclined surface 9b2. In other words, the transparent plate has a first adhesive layer 4 provided on the first flat surface 9a1, but not on the first inclined surface 9a2. The transparent plate has a second adhesive layer 5 provided on the second flat surface 9b1, but not on the second inclined surface 9b2. Thus, the exposed portions 9c are provided in a region along the four sides of the first surface 9a of the transparent plate 9 and in a region along the four sides of the second surface 9b of the transparent plate in this embodiment as observing the adhesive layer-equipped transparent plate 61 from a normal direction of the first flat surface 9a1, though a relevant plan view is omitted. The other features of the adhesive layer-equipped transparent plate 61 are the same as those according to the first embodiment.

According to the fifth embodiment also, it is possible to obtain the same effects as the first to fourth embodiments, such as improvement in the handling performance of the adhesive layer-equipped transparent plate 61 and easy bonding operation and peeling operation for the adhesive layer-equipped transparent plate 61.

Further, the adhesive layer-equipped transparent plate 61 according to the fifth embodiment has an advantageous effect described below.

When the adhesive layer-equipped transparent plate 61 is used, a first protective film 6 and a second protective film 7 are peeled from the transparent plate 9 as described above. It is assumed that, as shown in FIG. 13, an adhesive layer-equipped transparent plate 161 as a Comparative Example has end surfaces of a first adhesive layer 204 and a second adhesive layer 205 provided so as to extend to a position with the end surface 9f on the transparent plate 9 at a time of performing the peeling operation. When an attempt is made to peel the second protective film 7 in this case, the second adhesive layer 205 is also peeled from the transparent plate 9, adhering to the second protective film 7, and the second adhesive layer 205 could be lifted from the transparent plate 9 at an edge portion of the transparent plate 9. This problem is caused because the second adhesive layer 205 is not bonded to the transparent plate 9 at a position where the second protective film 7 should start being peeled (position represented by symbol D). This causes problems, such as a reduction in bonding strength and poor appearance in a peripheral portion of the adhesive layer-equipped transparent plate 161.

In contrast, since the adhesive layer-equipped transparent plate 61 according to the fifth embodiment has the exposed portions 9c provided on the first inclined surface 9a2 and the second inclined surface 9b2 of the transparent plate 9, the second adhesive layer 5 is bonded to the transparent plate 9 at the position where the second protective film 7 starts being peeled (position represented by symbols D). For this reason, only the second protective film 7 is peeled from the second adhesive layer 5 since the fifth embodiment reduces the possibility that the second adhesive layer 5 is peeled from the transparent plate 9, adhering to the second protective film 7. Thus, it is possible to improve problems, such as a reduction in the bonding strength and poor appearance in the peripheral edge portion of the adhesive layer-equipped transparent plate 61.

The present invention is not limited to the above-mentioned specific embodiments, and various modifications are possible without departing from the sprit and scope of the present invention.

For example, although the above-mentioned embodiments are explained in a case where the transparent plate has the exposed portions mainly provided on the first surface, similar exposed portions may be provided on the second surface, and the exposed portions may be provided on both of the first surface and the second surface.

Although the first embodiment is explained about a case where the exposed portions are provided in a region along each of two opposing long sides of the transparent plate as shown in FIG. 3, the exposed portions may be provided in a region along each of two opposing short sides of the transparent plate. Further, the exposed portions may not be provided in a region along each of two opposing sides, and may be provided in a region along each of two adjacent sides, for example. Although the exposed portions are preferred to be provided in a region along each of two opposing sides in the case of a large size of adhesive layer-equipped transparent plate, an adhesive layer-equipped transparent plate may be handled by use of the exposed portions in a region along each of two adjacent sides so long as the adhesive layer-equipped transparent plate has a small size.

Although explanation has been made about a case where the light-shielding portion is provided on a side of transparent plate facing a display device main body, the light-shielding portion may be provided on a side of the transparent plate facing the transparent support. Further, the transparent plate has the light-shielding portion provided along two opposing upper and lower or right and left sides, for example.

Further, as the transparent support constituting the display device, a window glass to be used in a store, an office or the like is mentioned as an example, however, instead of a window glass, a movable member, such as a glass partition partitioning a room, may be used as the transparent support, and a display device main body is bonded to the transparent support. Furthermore, a lenticular sheet may be used as the transparent support, and a display device main body may be bonded to the lenticular sheet to configure a stereoscopic image display system.

Further, as the display device main body, in addition to the liquid crystal display, an organic EL display, a plasma display, an electronic paper display, etc. may be used. Further, the shape, number, arrangement, material, etc. of each of the elements constituting the adhesive layer-equipped transparent plate and the display device are not limited to the ones of the above embodiments, and various modifications are possible.

INDUSTRIAL APPLICABILITY

The present invention is applicable to various display devices, such as a liquid crystal display, an organic EL display, a plasma display and an electronic paper display, and an adhesive layer-equipped transparent plate used to bond such display devices to a transparent support.

The entire disclosures of Japanese Patent Application No. 2017-244240 filed on Dec. 20, 2017 and Japanese Patent Application No. 2018-177605 filed on Sep. 21, 2018 including specifications, claims, drawings and summaries are incorporated herein by reference in their entireties.

What is claimed is:

1. An adhesive layer-equipped transparent plate comprising:
a transparent plate having a first vertical direction, wherein said transparent plate has a first surface and a second surface wherein the second surface is located on a side of said transparent plate opposite the first surface in said first vertical direction;
a first adhesive layer provided on the first surface; and
a second adhesive layer provided on the second surface;
wherein the transparent plate includes at least one of an exposed portion in a periphery of the first surface, where the first surface is exposed from the first adhesive layer, and an exposed portion in a periphery of the second surface, where the second surface is exposed from the second adhesive layer,
wherein the first surface includes a first flat surface in a central area on the transparent plate, and a first inclined surface provided in the periphery of the transparent plate so as to be inclined to the first flat surface and have contact with an end surface perpendicular to the first flat surface,
the second surface includes a second flat surface in a central area on the transparent plate, and a second inclined surface provided in the periphery of the transparent plate so as to be inclined to the second flat surface and have contact with an end surface perpendicular to the second flat surface,
the exposed portion is provided on each of the first inclined surface and the second inclined surface, and
wherein the first adhesive layer and second adhesive layer are provided on the first flat surface and the second flat surface, respectively.

2. The adhesive layer-equipped transparent plate according to claim 1, wherein the transparent plate is formed in a rectangular planar shape as observed from a normal direction of the first surface, and
the exposed portion is provided in a region along each of at least two sides of four sides of the rectangular planar shape so as to be present at a portion of each of the at least two sides.

3. The adhesive layer-equipped transparent plate according to claim 2, wherein the exposed portion is provided in a region along each of two opposing sides of the rectangular planar shape so as to be present at a portion of each of the two opposing sides.

4. The adhesive layer-equipped transparent plate according to claim 3, wherein the transparent plate is formed in an oblong planar shape as observed from a normal direction of the first surface, and
the exposed portion is provided in a region along each of two opposing long sides of the oblong shape so as to be present at a portion of each of the two opposing long sides.

5. The adhesive layer-equipped transparent plate according to claim 2, wherein the exposed portion is provided in a region along each of four sides of the rectangular planar shape so as to be present at a portion of each of the four sides.

6. The adhesive layer-equipped transparent plate according to claim 1, wherein the transparent plate is formed in a rectangular planar shape as observed from a normal direction of the first surface, and
the exposed portion is provided at a corner of the rectangular shape.

7. The adhesive layer-equipped transparent plate according to claim 1, wherein the first surface or the second surface has a light-shielding portion provided on the periphery thereof.

8. A display device comprising:
an adhesive layer-equipped transparent plate defined in claim 7;
a transparent support bonded to the first surface of the adhesive layer-equipped transparent plate; and
a display device main body bonded to the second surface of the adhesive layer-equipped transparent plate.

9. The display device according to claim 8, wherein the exposed portion is provided on at least the first surface.

10. The display device according to claim 8, wherein the transparent support comprises a window glass.

11. The display device according to claim 8, wherein the transparent support comprises a lenticular sheet.

12. The adhesive layer-equipped transparent plate according to claim 1, wherein the exposed portion is provided on both of the first surface and the second surface.

* * * * *